United States Patent
Lizarraga Senar (10) Patent No.: US 9,982,738 B2
(45) Date of Patent: May 29, 2018

(54) VARIABLE LOAD CONTROL SYSTEM IN A HYDRAULIC DEVICE

(71) Applicant: KYB SUSPENSIONS EUROPE, S.A., Ororbia (Navarra) (ES)

(72) Inventor: Javier Lizarraga Senar, Ororbia (ES)

(73) Assignee: KYB EUROPE HEADQUARTERS, GMBH, Ororbia (Navarra) (ES)

( * ) Notice: Subject to any disclaimer, the term of this patent is extended or adjusted under 35 U.S.C. 154(b) by 0 days. days.

(21) Appl. No.: 14/797,208

(22) Filed: Jul. 13, 2015

(65) Prior Publication Data

US 2016/0025174 A1    Jan. 28, 2016

(30) Foreign Application Priority Data

Jul. 23, 2014  (ES) .................................. 201431107

(51) Int. Cl.
*F16F 9/19* (2006.01)
*F16F 9/348* (2006.01)
(Continued)

(52) U.S. Cl.
CPC .............. *F16F 9/19* (2013.01); *F16F 9/3214* (2013.01); *F16F 9/348* (2013.01); *F16F 9/49* (2013.01); *F16F 13/007* (2013.01)

(58) Field of Classification Search
CPC ........ F16F 9/19; F16F 9/32; F16F 9/43; F16F 9/44; F16F 9/49; F16F 9/54; F16F 9/065;
(Continued)

(56) References Cited

U.S. PATENT DOCUMENTS 2,695,079 A * 11/1954 Brundrett ................... F16F 9/48
                                                  188/315
2,783,859 A *  3/1957 Patriquin ................... F16F 9/49
                                                  188/287
(Continued)

FOREIGN PATENT DOCUMENTS

DE   19829765 A1 *  2/1999  ............... F16F 9/49
DE   19829765 A1 *  2/1999  ............... F16F 9/49
(Continued)

OTHER PUBLICATIONS

International Search Report issued in International Application No. PCT/ES2015/070494 dated Aug. 3, 2015.

*Primary Examiner* — Robert A. Siconolfi
*Assistant Examiner* — San M Aung
(74) *Attorney, Agent, or Firm* — Wenderoth, Lind & Ponack, L.L.P.

(57) ABSTRACT

A hydraulic device includes a tubular housing, inside of which a rod is jointly attached to a piston separating upper and lower areas which hold hydraulic fluid so that, as the piston and rod move, the piston and the rod move together relatively and axially inside the tubular housing, displacing the hydraulic fluid inside the tubular housing, flowing from one of the upper and lower areas to the other of the upper and lower areas, and thus changing the respective volumes inside the upper and lower areas. The hydraulic device further includes a modular mechanism located inside the lower area that regulates shock absorption at a maximum level of compression of the hydraulic device, as well as in other relative positions.

15 Claims, 5 Drawing Sheets

(51) Int. Cl.
  *F16F 13/00* (2006.01)
  *F16F 9/49* (2006.01)
  *F16F 9/32* (2006.01)
(58) Field of Classification Search
  CPC .. F16F 9/185; F16F 9/187; F16F 9/348; F16F 9/364; F16F 9/516; F16F 9/585; F16F 9/0218; F16F 9/3221; F16F 9/3235; F16F 9/3271; F16F 9/3415; F16F 9/5126; F16F 13/007; F16F 9/48; F16F 9/50; F16F 9/53; F16F 9/165; B60G 13/08; B60G 15/061; B60G 15/063; B60G 17/08; B60G 2202/30; B60G 2206/40; B60G 2202/24; B60G 2200/142; B60G 15/062
  USPC .............. 267/140.13; 188/315, 322.19, 289, 188/282.1, 317
  See application file for complete search history.

(56) References Cited

U.S. PATENT DOCUMENTS

| | | | | |
|---|---|---|---|---|
| 2,984,321 | A | * | 5/1961 | Schultze ................ F16F 9/49 188/282.8 |
| 3,036,669 | A | * | 5/1962 | Schultze ................ F16F 9/49 188/282.1 |
| 4,133,415 | A | | 1/1979 | Dressell, Jr. et al. |
| 4,372,545 | A | | 2/1983 | Federspiel |
| 4,465,166 | A | | 8/1984 | Moore |
| 5,234,084 | A | | 8/1993 | Bell |
| 5,908,123 | A | | 6/1999 | Huggins |
| 5,927,523 | A | | 7/1999 | Huggins et al. |
| 6,776,269 | B1 | | 8/2004 | Schel |
| 2003/0234146 | A1 | | 12/2003 | Grundei |
| 2004/0094376 | A1 | | 5/2004 | van Wonderen et al. |
| 2010/0078275 | A1 | * | 4/2010 | Kazmirski ............ F16F 9/512 188/280 |
| 2015/0165861 | A1 | * | 6/2015 | Allen .................... B60G 17/08 267/64.26 |
| 2015/0192187 | A1 | * | 7/2015 | Smith .................... F16F 9/22 188/284 |

FOREIGN PATENT DOCUMENTS

| | | | |
|---|---|---|---|
| FR | 2995048 A1 | * | 3/2014 |
| FR | 2995048 A1 | * | 3/2014 |
| WO | 86/00675 | | 1/1986 |

* cited by examiner

VARIABLE LOAD CONTROL SYSTEM IN A HYDRAULIC DEVICE

OBJECT OF THE INVENTION

The present invention, as described in the title of this description, refers to a variable load control system in a hydraulic device that aims to regulate hydraulic load development during at least any of the periods when the device is operational.

The system is applicable to hydraulic devices such as shock absorbers, helping reduce problems of abruptness resulting after a first stroke ending at maximum compression and also during a second stroke ending at maximum extension, so that the reduction in abruptness is controlled especially at the end of each stroke, the first and the second, of the hydraulic device.

Therefore, the system of the invention aims to provide shock absorption for the hydraulic device, said absorption depending on the length of the shock absorber at each moment, and depending on the linear velocity of the shock absorber when it is active, both when it is moving towards maximum extension as well as when it is moving in the opposite direction towards maximum compression.

It should also be highlighted that the system of the invention allows a wide and varied range of geometries, layouts and materials, ensuring its adaptability and ease of configuration according to the boundary conditions and the dimensions of each application.

Therefore, the mechanism of a hydraulic device with hydraulic compression stop of a vehicle's shock absorber has been chosen for this invention.

BACKGROUND OF THE INVENTION

Currently, some hydraulic devices such as shock absorbers comprise two parts assembled together.

The first part comprises a piston-rod assembly, and the second part comprises a housing that features a tube cylindrical enough to allow a piston-rod assembly to slide inside it in the presence of hydraulic fluid.

This assembly allows to decouple the joint movement of the assembly to the tubular housing from the joint movement of the assembly to the piston-rod assembly, so that hydraulics are able to filter, either partially or totally, the frequencies that want to be prevented from transmitting from one assembly to the other.

Based on the geometric limitations of the physical environment where the shock absorber operates, the maximum distance the piston can travel inside the housing (the stroke of the shock absorber) is limited. In certain devices, said limitations are implemented by means of mechanical stops:
  When the minimum length of the shock absorber is limited, these stops are known as compression stops, maximum compression stops, etc.
  When the maximum length of the shock absorber is limited, these stops are known as rebound stops, maximum extension stops, etc.

In some applications of the shock absorber, the relative abruptness of these mechanical stopping devices can be undesirable due to lack of comfort, excessive noise, wearing out due to continued use, etc.

DESCRIPTION OF THE INVENTION

In order to reach the goals and to address the issues mentioned in the paragraphs above, the invention provides a variable load control system in a hydraulic device, wherein the hydraulic device comprises a tubular housing, in which a rod is jointly attached to a piston separating upper and lower areas filled with hydraulic fluid so that, as the piston and rod move, the two components travel together in both directions relative to the axis inside the tubular housing, displacing the hydraulic fluid inside the tubular housing from one area to the other, thus changing the volumes inside them; wherein the piston is moving in the hydraulic device towards a position of maximum compression, this movement of the piston towards the position of maximum compression progressively reducing the volume of the lower area, and the hydraulic device also adopting a rest position when it is at maximum extension.

It comprises a modular mechanism located inside the lower area of the tubular housing, sealed with a lid at the bottom end.

The upper and lower areas are connected through a series of through holes in the piston.

The modular mechanism comprises an upper tubular head within which a lower tube is fitted and guided, with an annular support fitted on its bottom end, the upper tubular head moving along the axis when it is travelling down towards the position of maximum compression of the hydraulic device, as well as when it is travelling up in the opposite direction towards the position of maximum extension of the hydraulic device.

The upper tubular head has a series of through holes on its walls that connect an inner chamber that is enclosed by the inner sides of the lower tube and the upper tubular head, with an outer annular chamber that is enclosed by the inner side of the tubular housing and the outer sides of the upper tubular head and the lower tube.

The annular support has a series of through holes that connect it with the outer annular chamber.

In one embodiment, the through holes of the annular support are facing a frontal disc attached to the lid; wherein the combination of the through holes and the frontal disc defines a valve device that regulates the passage of hydraulic fluid though said through holes when the lower side of the annular support touches the frontal disc.

In an alternative embodiment to the one described in the paragraph above, no frontal disc is used, so that the through holes of the annular support are facing the lid; wherein the combination of the through holes and the lid defines a valve device that regulates the passage of hydraulic fluid through the through holes when the lower side of the annular support touches the frontal disc.

The annular support is fitted against the inner face of the tubular housing.

One of the lower sides of the annular support comprises a lower recess where the through holes lead into, while an upper side of the annular support comprises an upper recess where the bottom end of the lower tube is fitted.

The through holes of the upper tubular head comprise a series of through slots that extend to the lower rim of the upper tubular head.

In one embodiment, the upper tubular head of the modular mechanism is joined with the piston, while in another alternative embodiment the upper tubular head of the modular mechanism and the piston are two independent and separate components.

In one embodiment, the modular mechanism is complemented with a compression coaxial spring. The ends of the compression coaxial spring abut against the annular support and against a series of radial extensions on the upper tubular head. The series of radial extensions are fitted against the inner side of the tubular housing, so that the upper tubular head can travel along the axis both against the resistance of the coaxial spring when it is travelling down against the resistance of the coaxial spring to a position of maximum compression of the hydraulic device, as well as when it is travelling up in the opposite direction towards the position of maximum extension of the hydraulic device when the coaxial spring tends to move the upper tubular head up along the axis, with the coaxial spring being located inside the outer annular chamber.

The rod comprises lower extension that reaches below the piston where, in some of the positions of the shock absorber device, this lower extension fits loosely inside the lower tube, wherein the loosely fitting defines an annular passage of hydraulic fluid.

The upper tubular head comprises a tapered upper mouth.

In one embodiment, the upper head of the annular mechanism comprises an area with lower superficial hardness than the area of the piston that it is connected to, so that the initial contact between part of the piston and the upper tubular head when they approach each other is cushioned by the area of lower hardness.

According to what has been described in the previous paragraph, the region of lower superficial hardness is determined by an annular body joined to an upper rim of the upper tubular head.

In regard to the embodiment without the coaxial spring, the assembly of the lower tube and the annular support are joined to the tubular housing by interference fit, fixing the annular support to the tubular housing, so that in this case the coaxial spring is not needed to restore the original position of the system of the invention after an operating cycle.

Therefore, the variable load control system of the invention plays a key role in reducing the problems resulting from abrupt stops when the hydraulic device is operating in the way described below.

The upper tubular head touches the piston of the hydraulic device and signals the system to come into operation.

The frontal disc, together with the through holes of the annular support, constitute a valve device that regulates the passage of fluid going in and out of said through holes, which lead into the coaxial outer chamber.

The through slots located on the wall of the upper tubular head control the cross-section passage of hydraulic fluid through them according to the relative position between the lower tube and the upper tubular head, which is the component travelling relative to the lower tube.

The coaxial spring, assembled by interference fit to the annular support and the upper tubular head, has the goal of restarting the system back to its initial state after an operating cycle.

Therefore, thanks to the system of the invention it is possible to provide shock absorption relative to the length and the velocity of the shock absorber. Furthermore, its design allows a wide and varied range of geometries, layouts and materials, ensuring its adaptability and ease of configuration according to the boundary conditions and the dimensions of each application.

Hereinafter, in order to give a better understanding of the description, the object of the invention has been detailed in a series of drawings that are an integral part thereof and are for illustration purposes and without limitation.

DESCRIPTION OF AN EXAMPLE OF AN EMBODIMENT

Considering the numbering adopted for the figures, the variable load control system in a hydraulic device features the following nomenclature used in the description:
1.—Tubular housing
2.—Modular mechanism
3.—Rod
3a.—Lower extension
4.—Piston
4a.—Perimeter skirting
5.—First upper area
6.—Second lower area
7.—Lid
8.—Through perforations (holes)
9.—Annular slots
10.—Upper tubular head
10a.—Radial extensions
11.—Lower tube
12.—Annular support
12a.—Upper recess
12b.—Lower recess
13.—Coaxial spring
14.—Frontal disc
15.—Through holes
16.—Outer annular chamber
17.—Inner chamber
18.—Tapered upper mouth
19.—Through slots
20.—Upper tab
21.—Annular passage
22.—Main body
23.—Upper level
24.—Annular body The hydraulic device shown on the drawings is a shock absorber placed in a vertical position comprising a tubular housing (1) within which a modular mechanism is located (2), which has a rod (3) attached to a piston (4) placed above it that separates a first upper area (5) above the piston (4) and a second lower area (6) below the piston (4), with the assembly of the modular mechanism (2) located in this second lower area (6).

Under the modular mechanism, (2) and closing the tubular housing (1), a lid (7) is fitted to the bottom end of said tubular housing (1).

The aforementioned areas, upper (5) and lower (6), are connected via a series of through perforations (holes) (8) on the piston (4) that allow the passage of hydraulic fluid when the shock absorber is operational.

The piston (4) comprises a perimeter skirting (4a), the outer side of which is fitted against the inner side of the tubular housing (1), and said outer side of the perimeter skirting (4a) also has a series of annular slots (9).

In one embodiment, the piston (4) is separated from the modular mechanism (2) and they are not attached together, whilst in another embodiment, the piston (4) is connected to the modular mechanism (2) through the perimeter skirting (4a) of the aforementioned piston (4).

When the piston (4) is separated from the modular mechanism (2) and they are not attached together, in one of the embodiments the upper tubular head (10) comprises an area of lower superficial hardness than the material hardness of the piston (4), so that when the piston (4) and the modular mechanism (2) move closer together until they make contact, this initial contact between the exterior skirting (4a) and the upper tubular head (10) is a soft, cushioned contact that improves the operation of the hydraulic device.

In order to achieve this, the area with the lower hardness in one of the embodiments is determined by an annular body (24) attached to an upper rim of the upper tubular head (10).

Figure 7:
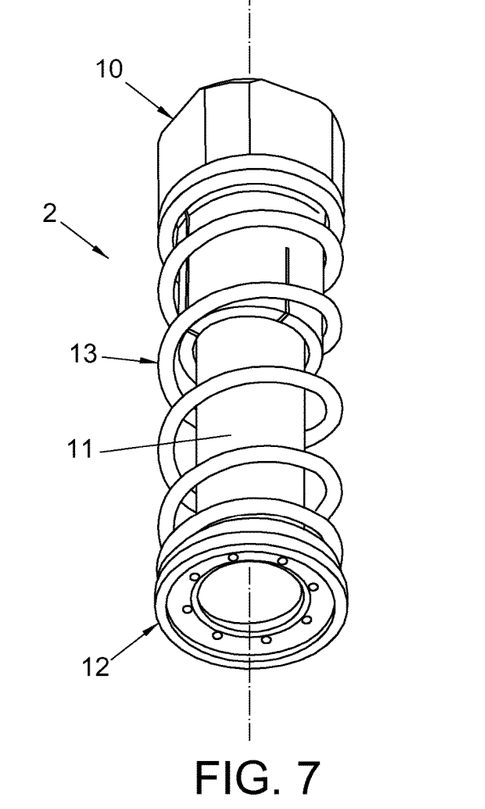
FIG. 7.—Shows a perspective view of a modular mechanism placed within a tubular housing under a piston attached to a rod travelling in both directions along the axis inside the tubular housing while the shock absorber is operational.
Figure 8:
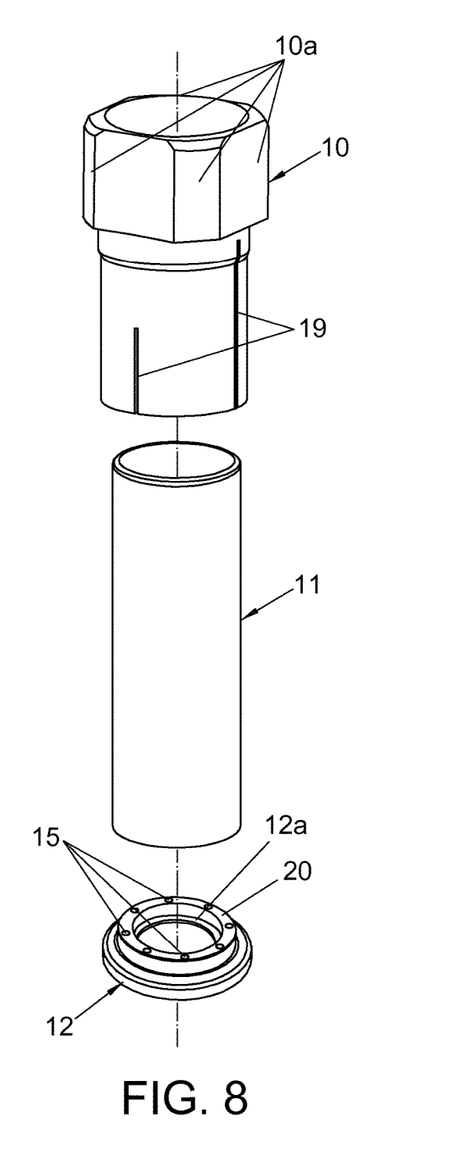
FIG. 8.—Shows a perspective view of the modular mechanism also shown in the previous figure.

The modular mechanism (2), as it is shown more clearly on FIGS. 7 and 8, comprises an upper tubular head (10) wherein a lower tube (11) is fitted and guided, with an annular support (12) fitted on its bottom end. The modular mechanism (2) is completed by a compression coaxial spring (13) connected on both ends to the annular support (12) and to a series of radial extensions (10a) on the upper tubular head (10). Said radial extensions (10a) are fitted against the inner side of the tubular housing (1) to ensure that the upper tubular head (10) can travel with precision along the axis inside the tubular housing (1), both against the resistance of the coaxial spring (13) when the upper tubular head (10) is travelling down against the resistance of the coaxial spring (13) to a position of maximum compression of the shock absorber, as well as when it is travelling in the opposite direction towards the position of maximum extension when the coaxial spring (13) tends to move the upper tubular head (10) up along the axis.

The annular support (12) has a first upper recess (12a) where the bottom end of the lower tube (11) is fitted, and a second lower recess (12b) facing a frontal disc (14) attached to the lid (7) closing the bottom end of the tubular housing (1).

The annular support (12) also incorporates a series of through holes (15) connecting the lower recess (12b) of said annular support (12) with an outer annular chamber (16) outside the lower tube (11), so that said outer annular chamber (16) is enclosed by the inner face of the tubular housing (1) and the outer sides of the lower tube (11) and the upper tubular head (10). It is worth noting that the coaxial spring (13) of the modular mechanism (2) is located inside the outer annular chamber (16).

The outer annular chamber (16) is complemented by an inner chamber (17) enclosed by the inner faces of the inner tube (11) and the upper tubular head (10). This component has a tapered upper mouth (18) in an inverted position.

In some of the positions of the modular mechanism (2), as will be described later on, the bottom of the lower recess (12b) of the annular support (12) abuts against the frontal disc (14), partially blocking (at the least) the through holes (15) of the annular support (12). Therefore, the passage of hydraulic fluid going in and out of the through holes (15) will restricted or even stopped when the shock absorber travels towards the position of maximum compression and reduces its length.

One section of the wall of the upper tubular head (10) has a series of through slots (19) that allow the passage of hydraulic fluid between the outer annular chamber (16) and the inner chamber (17) in some of the relative positions between the upper tubular head (10) and the lower tube (11), reaching the maximum cross-section flow when the shock absorber is placed in the position of maximum extension when the coaxial spring (13) is at rest, fully extended and without tension.

By contrast, in the position of maximum compression of the shock absorber, the full length of the through slots (19) are facing the lower tube (11), so that the cross-section flow of hydraulic fluid going in and out of the through slots (19) is null. In this case the hydraulic fluid is restricted to the cross-section passage of the through holes (15) of the annular support (12) by the limitation imposed by the frontal disc (14) when it reaches the bottom of the lower recess (12b) of the annular support (12).

It is worth highlighting that, as the shock absorber approaches the position of maximum compression, there is a progressive reduction in the cross-section passage of fluid between the outer annular chamber (16) and the inner chamber (17) that leads into the upper area (5) above the piston (4). This reduction in the passage of hydraulic fluid is achieved by means of a valve device determined by the combination of the through holes (15) of the annular support (12) and the frontal disc (14) facing the lower recess (12b) of said annular support (12) where said through holes (15) lead into.

When the shock absorber reaches its maximum compression, the lower rim of the upper tubular head (10) contacts the annular support (12), which in turn also contacts the lid (7) closing the bottom end of the tubular housing (1). Specifically, the annular support (12) comprises an upper tab (20) that the upper tubular head (10) abuts against when it is in the position of maximum compression.

Figure 4:
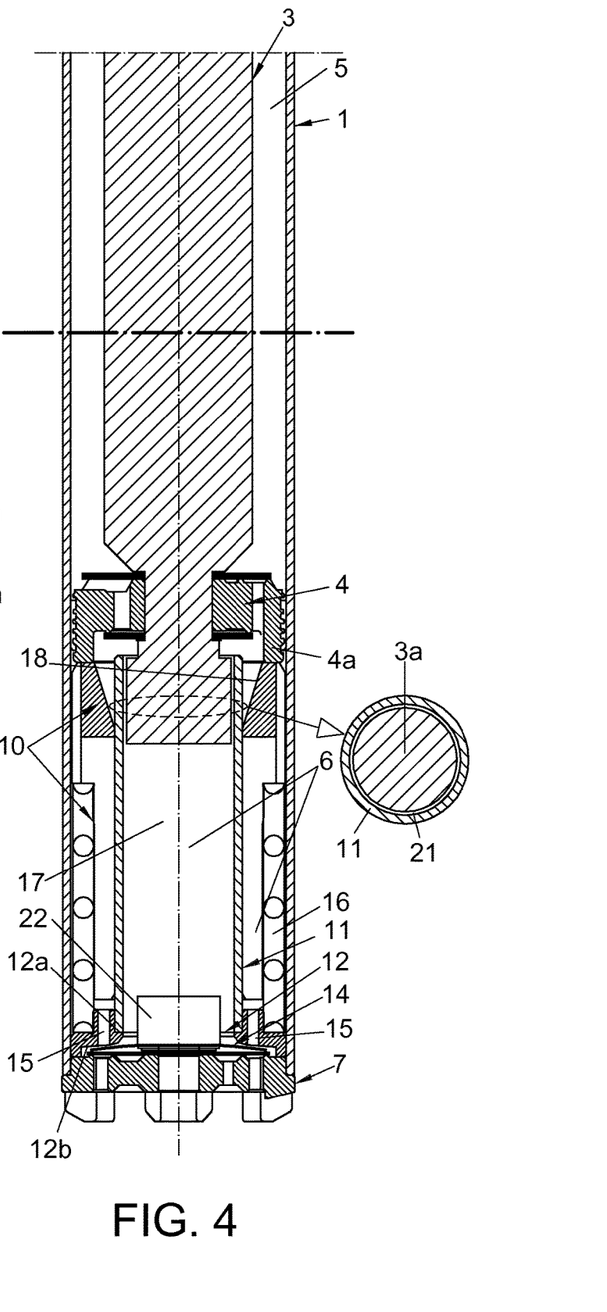
FIG. 4.—Shows a cross-section elevation view where the shock absorber is in a position near its maximum compression.

Moreover, the piston (3) comprises a lower extension (3a) that extends down and reaches below the piston (4), so that in the position of maximum compression of the shock absorber and also in positions approaching maximum compression (FIG. 4), this lower extension (3a) of the piston (3) fits loosely inside the lower tube (11). The loosely fitting defines a gap that in turn defines the annular passage (21) of hydraulic fluid and aiding the stop of the rod (3) and piston (4) assembly when the shock absorber is approaching maximum compression.

Figure 1:
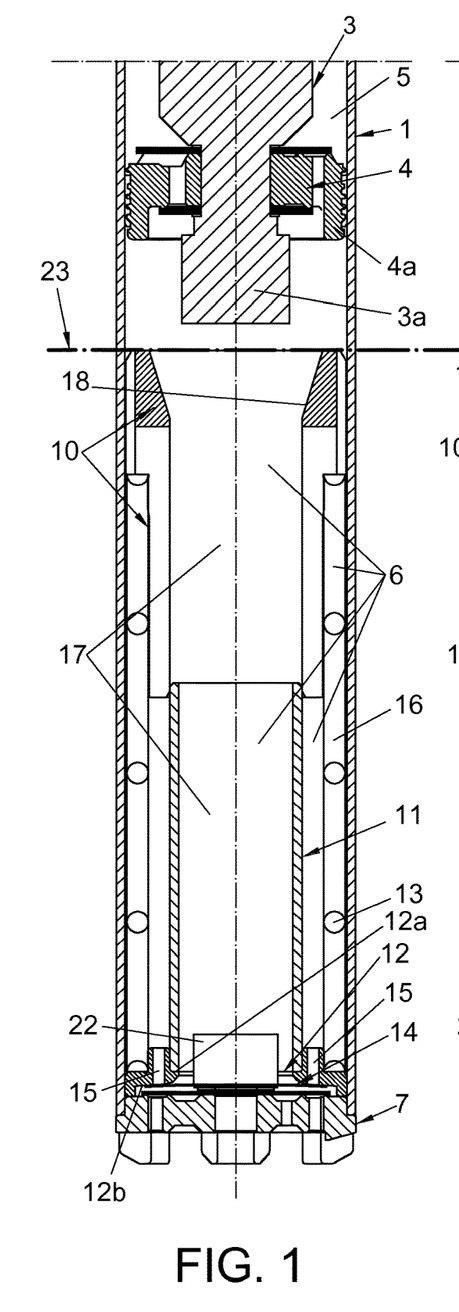
FIG. 1.—Shows a cross-section elevation view of a hydraulic device comprising the variable load control system which is the object of the invention. The hydraulic device is a shock absorber in the position of maximum extension.
Figure 2:
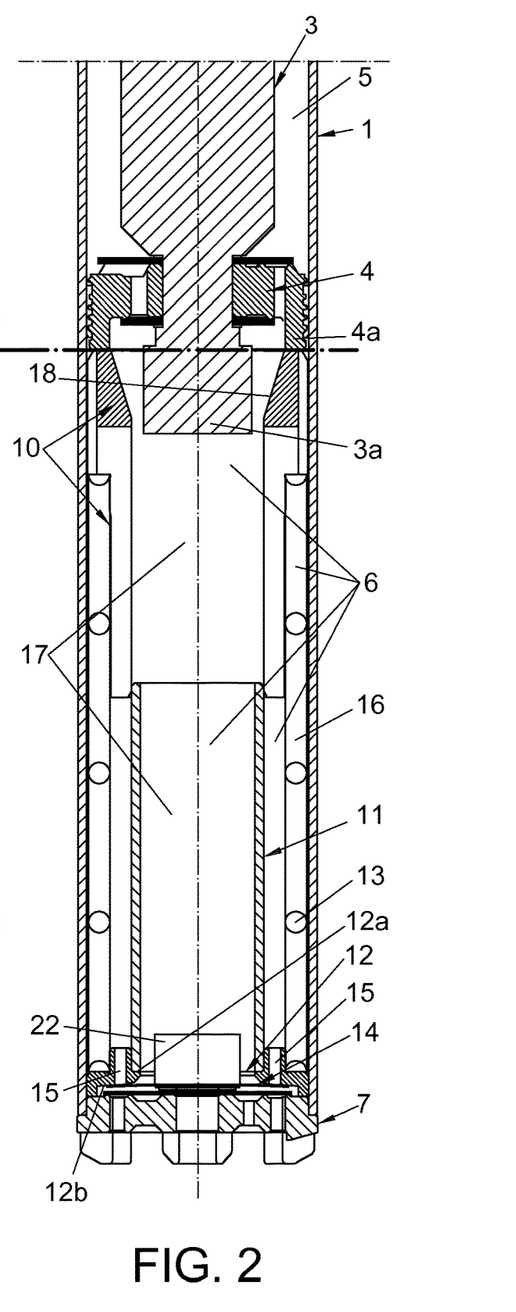
FIG. 2.—Shows a cross-section elevation view of the hydraulic device similar to the one in FIG. 1, where the shock absorber is in a position near its maximum extension.
Figure 3:
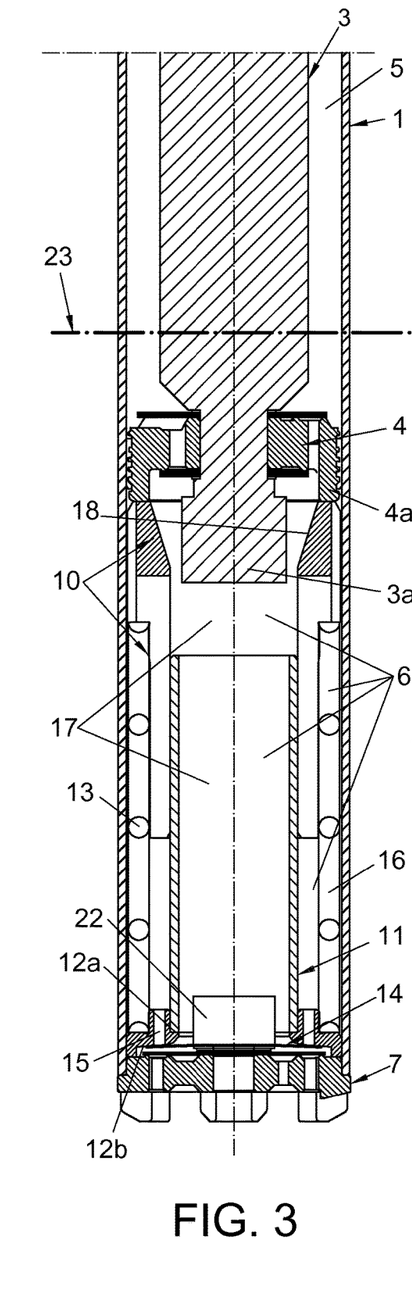
FIG. 3.—Shows a view similar to the previous ones, where the shock absorber is in an intermediate position.
Figure 5:
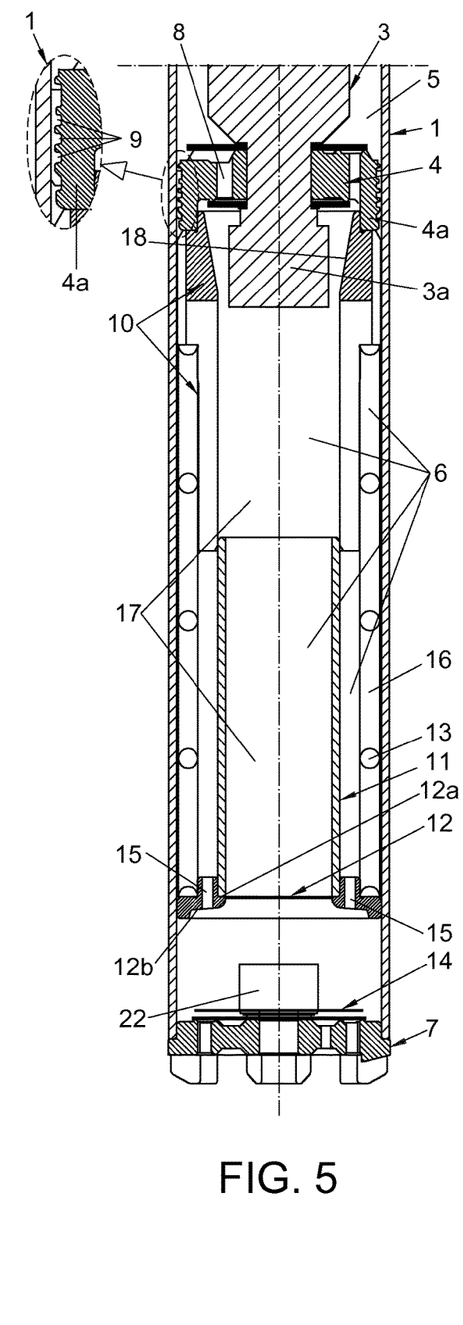
FIG. 5.—Represents a cross-section view of the shock absorber designed according to a second embodiment, which has a few differences with the first embodiment shown in the previous figures.
Figure 6:
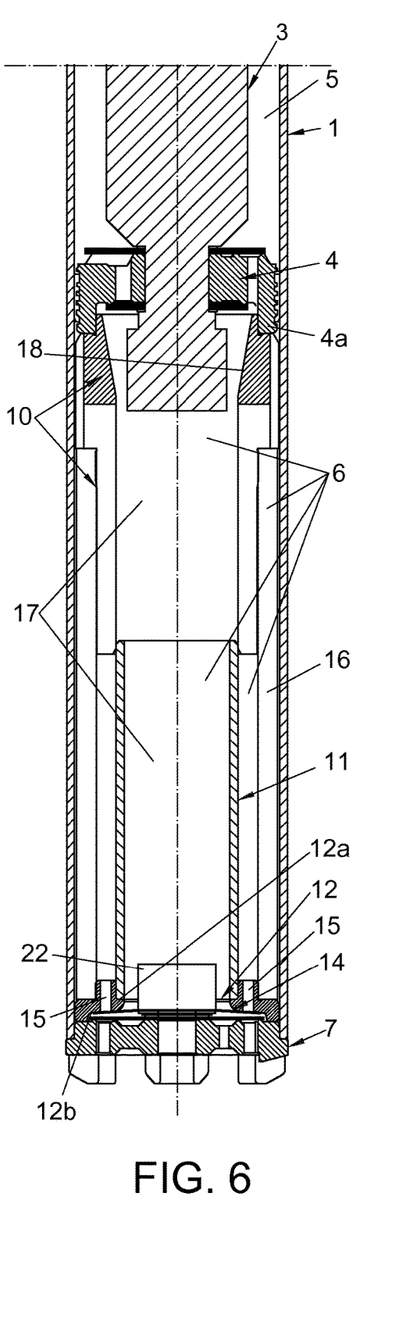
FIG. 6.—Shows a cross-section view of the shock absorber designed according to a third embodiment, which has some differences with the previous figures.

The position of maximum extension of the shock absorber is shown on FIG. 1 and also on FIGS. 2, 5 and 6.

On FIG. 1, the piston (4) is separated from upper tubular head (10), while on FIGS. 5 and 6, the upper head (10) is attached to the skirting (4a) of the piston (4). In this case, when the shock absorber tends to recover the position of maximum extension, the upwards movement of the piston (4) pulls up with it the assembly of the modular mechanism (2), separating from the lid (7) and also from the frontal disc (14), as shown on FIG. 5. In other cases, the piston (4) only pulls up with it the upper tubular head (10).

According to FIG. 1, when the shock absorber tends to recover the position of maximum extension, the piston (4) does not pull up with it the modular mechanism (2), so that in this case the upper tubular head (10) regains the position of maximum extension by means of the coaxial spring (13).

As the rod (3) and piston (4) assembly travels down to the position of maximum compression, the upper tubular head (10) travels down against the resistance of the coaxial spring (13), progressively reducing the passage of hydraulic fluid between the outer annular chamber (16) and the inner chamber (17) by means of the through slots (19) of the upper tubular head (10), with the hydraulic fluid travelling from the inner chamber (17) to the first upper area (5) above the piston (4). The passage of hydraulic fluid flows in and out of the through holes (15) of the annular support (12) that is part of the valve device (2), which is comprised of the combination of these through holes (15) and the frontal disc (14).

In the final stage of the descent of the piston (4), the lower extension (3a) of the rod (3) enters the lower tube (11) restricting the passage of hydraulic fluid even further, in the way that has been explained above.

By contrast, when the shock absorber is travelling to the position of maximum extension, aided by the tension of the coaxial spring (13), a pumping effect causes the hydraulic fluid to flow from the first upper area (5) above the piston (4) to the second lower area (6) where the assembly of the modular mechanism (2), the inner chamber (17) and the outer annular chamber (16) are located.

The frontal disc (14) is attached to the lid (7) by means of a main body (22).

It is worth noting that the annular support (12) is fitted against the inner face of the tubular housing (1).

Depending on the position of the modular mechanism (2) shown, for example, on FIG. 1, the rod (3) will travel down during the compression stroke of the shock absorber. Therefore, in the moments before the modular mechanism (2) comes into operation, the rod (3) is in such a position so that the skirting (4a) of the piston (4) is not touching any components of the modular mechanism (2). That is, the skirting (4a) of the piston (4) is in an area of the tubular housing (1) above an upper level (23) to the entry point when the system comes into operation, so that said upper level (23) corresponds with the upper rim of the upper tubular head (10). In this case, the coaxial spring (13) keeps the upper tubular head (10) and the lower tube (11) at maximum extension. The hydraulic fluid is free to move between the piston (4) towards the valve device comprising the frontal disc (14) and the through holes (15) of the annular support (12). When the hydraulic device comes into operation, the following sequence of events takes place.

The skirting (4a) of the piston (4) contacts the upper rim of the upper tubular head (10) so that the passage of hydraulic fluid on the outside of said upper tubular head (10) is prevented and the lower area (6) is divided into two chambers: the inner compression chamber (17) and the outer annular compression chamber (16).

The inner chamber (17) is defined on the upper side by the inner area of the piston (4), the inner diameter of the skirting (4a), the tapered upper mouth (18) of the upper tubular head (10), the inner side of the lower tube (11), an inner region of the annular support (12) and the frontal disc (14). In the inner chamber (17), the passage of hydraulic fluid from the piston (4) to the valve device stays unchanged, just as in the normal operation of the shock absorber.

The outer annular chamber (16) is defined on the upper side by an outer and a lower part of the skirting (4a) of the piston (4), the outer surfaces in the top part of the upper tubular head (10), the outer side of the lower tube (11), an outer area of the annular support (12) and the inner side of the tubular housing (1).

In the outer annular chamber (16), the passage of fluid reaches the inner chamber (17) by means of the through slots (19) of the upper tubular head (10) and the through holes (15) of the annular support (12). Initially, the through holes (15) of the annular support (12) are fully or partially closed by the frontal disc (14) attached to the lid (7) closing the bottom end of the tubular housing (1).

It might be the case that, depending on the design, the perimeter skirting (4a) contacts the upper rim of the upper tubular head (10) without any interference between the inner diameter of said upper tubular head (10) and the outer diameter of the lower tube (11). In this case, the perimeter skirting (4a) of the piston (4) connects with the upper tubular head (10) when the rod (3) and piston (4) assembly travels downwards.

The skirting (4a) of the piston (4) pushes the upper rim of the upper tubular head (10), forcing it to travel downwards and to compress the coaxial spring (13). The higher the compression of the shock absorber, the lower the descent of the upper tubular head (10) and, therefore, the bigger the shut-off interference between the upper tubular head (10) and the lower tube (11), so that the cross-section flow going in and out of the through slots (19) and the upper tubular head (10) progressively decreases.

Initially, the valve device almost completely blocks the passage of hydraulic fluid going in and out of the through holes (15) of the annular support (12), so that the ejection of the hydraulic fluid inside the outer annular chamber (16) towards the inner chamber (17) goes out of the through slots (19). As the cross-section passage decreases, the pressure in the outer annular chamber (16) increases.

This measure of control generates an initially soft shock absorption, the load of which depends on the position of the shock absorber (of a higher or lower cross-section passage through the through slots (19) and of the velocity), which generates a force that is the square function of the velocity.

When the cross-section flow of the through slots (19) is small enough, the ejection of hydraulic fluid generates enough pressure to overcome the resistance of the closed valve device, with the pressure opening the through holes (15) of the annular support (12) in a controlled way.

This measure of control, coupled with the previous one, prevents the load from increasing excessively as velocity increases. The square function of the load curve is corrected. This way, for the same position of the shock absorber inside this area, the linear increase of the load is practically proportionate to the velocity.

When the lower tube (11) completely blocks the through slots (19), the only way out of the hydraulic fluid are the through holes (15) of the annular support (12). At this point, when the valve device is fully opened, the increase of the load becomes a square function again. However, the area or cross-section passage is wide enough so that the effect of the square function is barely noticeable. In fact, the most significant aspect is that the point of maximum load gets slightly ahead with the velocity, which provides an additional advantage when a strong compression takes place.

In the case of a block structure design (when the bottom end of the upper tubular head (10) is connected to the annular support (12)), force is transmitted by means of the following chain of components: piston (4), upper tubular head (10) and annular support (12). The bottom end of the upper tubular head (10) touches the annular support (12) blocking the through holes (15) with the frontal disc (14), which generates a hydraulic blocking in the outer annular chamber (16). If this excessive pressure resulted undesirable because of how it affects the piston (4) and the annular support (12), a conventional component of mechanical stop is used.

When the shock absorber starts the stroke towards the position of maximum extension, the rod (3) travels up so that the skirting (4a) of the piston (4) stops the pressure on the upper tubular head (10). The outer annular chamber (16) stops decreasing and starts increasing, so that the pressure drops and the flow of hydraulic fluid is reversed, allowing the valve device to close the through holes (15). The pressure on the outer annular chamber (16) decreases until it is equal to the pressure on the inner chamber (17), and the piston (4) separates from the upper tubular head (10) allowing the passage of hydraulic fluid between the outer surface of the upper tubular head (10) and the inner side of the tubular housing (1).

The coaxial spring (13) tends to decompress and return to its equilibrium position. Since it is assembled at each end by interference fit to the upper tubular head (10) and the annular support (12), and at the same time, said annular support (12) is assembled to the tubular housing (1), the entire assembly reaches a rest position and does not move.

When the shock absorber starts to compress or extend, and the direction of the passage of hydraulic fluid is reversed and the valve device shuts off, the flow towards the outer annular chamber (16) takes place through the through holes (15) of the annular support (12) and the through slots (19) of the upper tubular head (10), unless these have been fully blocked by the inner tube (11).

Since the flow through these passages is not enough to supply hydraulic fluid from the inner chamber (17) to the outer annular chamber (16), the action of the coaxial spring (13) is aided by the fact that the piston (4) climbs faster than the upper tubular head (10) and sucks it up, which produces a depression in the outer annular chamber (16) so that the upper tubular head (10) brakes and separates lightly from the piston (4), allowing the entry of hydraulic fluid. The upper tubular head (10) follows the piston (4) until it reaches a rest position.

It is worth highlighting that, as shown in FIGS. 7 and 8 as cases of non-limiting examples, the basic geometric shapes of the design tend to be generated depending on the revolutions of the axis of the rod (3). However, this is not mandatory since the final shape will depend on the variation of the area desired, as well as on other specifications such as weight, resistance, inertia, etc. One of the advantages of the current design is that the end product can be made component by component to optimize the continuous control of the passage area. In this regard, the following is observed:

The assembly of the valve device is vital for the invention since controlling the braking pressure of the compression stop depends on its configuration, contrary to other inventions of a similar nature. In this sense, the geometry of the valve device is not limited exclusively to what is shown in the drawings.

It can be comprised of one or more valve devices, the cumulative resistance of which will dictate the behavior of the compression stop.

It can comprise different geometries for through holes and slots, or in general, any kind of slot that assists the way in which the hydraulic fluid flows towards the annular support (12).

It can be built using different methods such as stamping, sintering, machining, etc., and with any material capable of resisting the stresses generated during operation, such as steel, bronze, aluminum, etc.

The upper tubular head (10) has the function of modifying the load depending on its position. Once again, its geometry is not limited exclusively to what is shown in the drawings.

The through slots (19) of the upper tubular head (10) can be designed with one or many slots, holes or windows, and in general, with any kind of slot that helps the way in which the cross-section passage changes with the increase of the interference area between the upper tubular head (10) and lower tube (11) in order to produce an entry with higher or lower abruptness.

It can be created with metals, composite materials or plastic, depending on the stresses and the complexity of the slots or holes made.

The lower tube (11) progressively blocks the through slots (19) of the upper tubular head (10). However, its geometry does not need to be completely solid since it can comprise slots connecting to the inner chamber (17) and the outer annular chamber (16) so that the variation of the load produces a higher or lower abruptness.

The annular support (12) holds the valve device in combination with the frontal disc (14). Once again, its geometry is not limited exclusively to what is shown in the drawings and can comprise various slots to control the load variation when the pressure in the outer annular chamber (16) forces the valve device to open the passage of hydraulic fluid.

Figure 9:
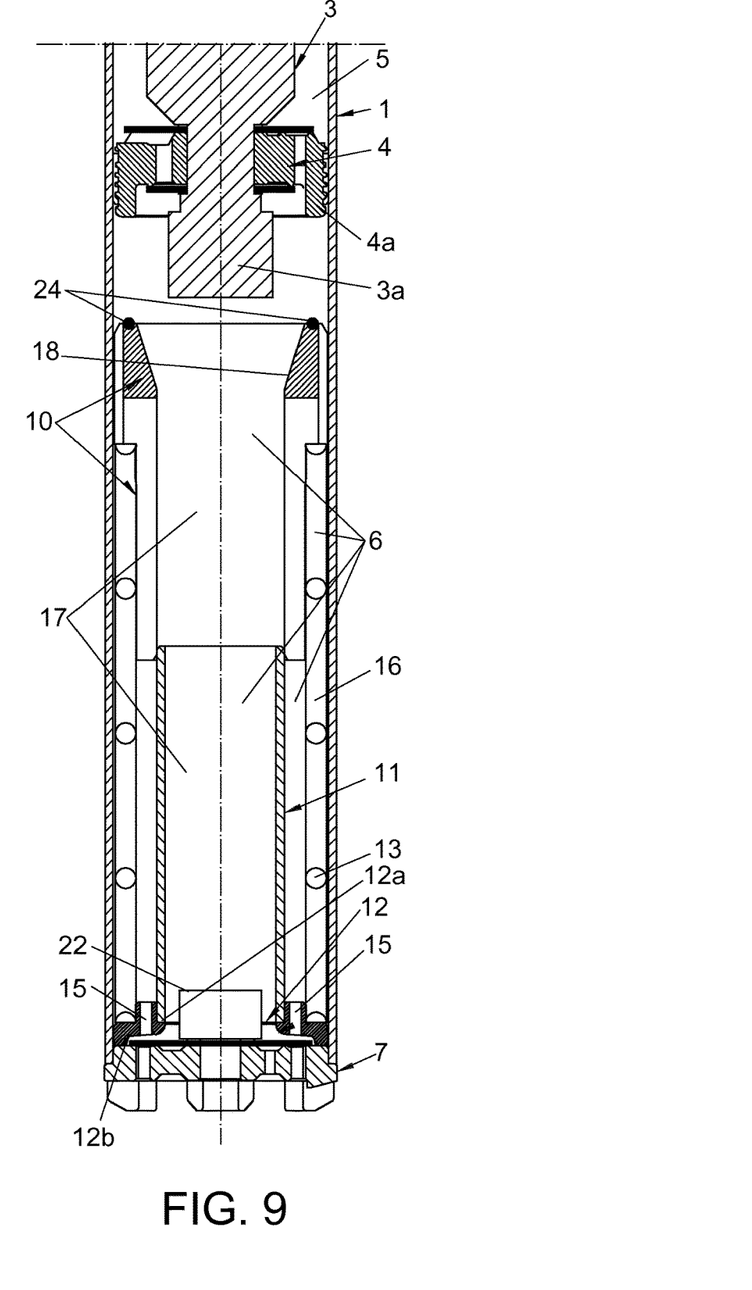
FIG. 9.—Shows a cross-section view of the shock absorber designed according to a fourth embodiment, which is implemented with fewer geometric components.

As shown on FIG. 9, the versatility of the system of the invention allows the annular support (12) to rest directly on the lid (7) without the need of a frontal disc (14), with the annular support (12) and lid (7) comprising the necessary slots to control the load. It could also do without all or part of the geometric components comprised between the annular support (12) and the lid (7), which form part of the valve device.

The coaxial spring (13) is in charge of returning the assembly to its initial state, as well as providing the load depending on the position. To optimize how the hydraulic load is regulated and the assembly is returned to its initial state, the coaxial spring (13) can have constant or variable resistance and be comprised of a wire of any choice in terms of shape and size, or by a series of rings. It can be fitted by interference fit or also by means of an additional component.

However, there is also an embodiment where the coaxial spring (13) is not used, as shown on FIG. 6, when the upper head (10) is joined to the skirting (4a) of the piston (4).

Therefore, in regards to the embodiment without the coaxial spring (13), the assembly of the lower tube (11) and the annular support (12) are connected to the tubular housing (1) by interference fit, fixing the annular support (12) to the tubular housing (1), so that in this case the coaxial spring (13) is not needed to restore the original position of the system of the invention after an operating cycle. In this case, the upper tubular head (10) is connected to the exterior skirting (4a) of the piston (4).

Following what has been outlined in the previous paragraph, the hydraulic device comes into operation when the upper part of the lower tube (11) enters inside the lower part of the upper tubular head (10), following the movement of the piston (4) that is attached to said upper tubular head (10).

Given the versatility and the many possible designs of the invention, the assembly can be used in different positions for various applications. In regards to the shock absorber, the invention can be used as a hydraulic compression stop or a hydraulic rebound stop. It is valid for any mono-tube or bi-tube technology and can be installed in the main body of the shock absorber or in adjacent bodies, for example, in reserve chambers of hydraulic fluid.

In general, the invention is applicable for any hydraulic device designed to be part of a structure, both mobile or fixed, to provide mechanical-hydraulic end of stroke as it takes place in structures (solar panels, metallic structures for buildings, etc.) or in vehicles.

The invention claimed is:

1. A variable load control system in a hydraulic device, wherein the hydraulic device comprises a tubular housing, wherein a rod is attached to a piston separating upper and lower areas filled with hydraulic fluid so that, as the piston and the rod move, the rod and the piston travel together relative to an axis inside the tubular housing, displace the hydraulic fluid inside the tubular housing from one of the upper area and the lower area to the other of the upper area and the lower area, and thus change respective volumes inside the upper area and the lower area; wherein the piston is configured to move in the hydraulic device towards a position of maximum compression such that the volume of the lower area is progressively reduced, wherein the hydraulic device adopts a rest position when the hydraulic device is at maximum extension; and wherein:
the variable load control system comprises a modular mechanism located inside the lower area of the tubular housing, and sealed with a lid at a bottom thereof;
the upper and lower areas are directly connected through a series of through perforations in the piston;
the modular mechanism comprises an upper tubular head with a lower tube directly fitted and guided so as to be capable of sliding, with an annular support fitted on a bottom end thereof, within the upper tubular head and having axial mobility when the upper tubular head travels down towards the position of maximum compression in the hydraulic device, and when the upper tubular head travels up in an opposite direction towards a position of maximum extension of the hydraulic device;
the upper tubular head has a series of through slots on walls thereof that connect an inner chamber, that is enclosed by inner sides of the lower tube and the upper tubular head, with an outer annular chamber that is defined by the inner side of the tubular housing and outer sides of the upper tubular head and the lower tube;
the annular support has a series of through holes that connect the inner chamber to the outer annular chamber;
the through holes of the annular support face a frontal disc attached to the lid; and
a combination of the through holes of the annular support and the frontal disc defines a valve device that regulates passage of hydraulic fluid in and out of the through holes of the annular support when a lower side of the annular support approaches the lid to contact the frontal disc and moves away from the lid to separate from the frontal disc.

2. The variable load control system in a hydraulic device, according to claim 1, wherein the through holes of the annular support face the lid; and wherein a combination of the through holes of the annular support and the lid defines a valve device that regulates passage of hydraulic fluid in and out of the through holes of the annular support when a lower side of the annular support contacts the lid.

3. The variable load control system in a hydraulic device, according to claim 1, wherein the annular support fits, so as to be capable of sliding, against the inner side of the tubular housing.

4. The variable load control system in a hydraulic device, according to claim 3, wherein one of lower sides of the annular support comprises a lower recess where the through holes lead into.

5. The variable load control system in a hydraulic device, according to claim 3, wherein one of upper sides of the annular support comprises an upper recess where a bottom end of the lower tube is fitted.

6. The variable load control system in a hydraulic device, according to claim 1, wherein the through slots of the upper tubular head comprise a series of through slots that extend to a lower rim of the upper tubular head.

7. The variable load control system in a hydraulic device, according to claim 6, wherein the upper tubular head of the modular mechanism is attached to the piston.

8. The variable load control system in a hydraulic device, according to claim 6, wherein the upper tubular head of the modular mechanism and the piston are two independent and separate components.

9. The variable load control system in a hydraulic device, according to claim 6, wherein the modular mechanism further comprises a compression coaxial spring connected on both ends to the annular support and to a series of radial extensions on the upper tubular head, the radial extensions fitting against the inner side of the tubular housing, so that the upper tubular head axially moves both against a resistance of the compression coaxial spring when the upper tubular head travels down to the position of maximum compression of the hydraulic device, as well as when the upper tubular head travels up in the opposite direction towards the position of maximum extension of the hydraulic device when the compression coaxial spring tends to move the upper tubular head up along the axis, with the compression coaxial spring being located inside the outer annular chamber.

10. The variable load control system in a hydraulic device, according to claim 9, wherein the rod integrates a lower extension that reaches below the piston where, in some positions of the shock absorber device, the lower extension fits loosely inside the lower tube, the loose fitting defining an annular passage of hydraulic fluid.

11. The variable load control system in a hydraulic device, according to claim 1, wherein the rod integrates a lower extension that reaches below the piston where, in some positions of the shock absorber device, the lower extension fits loosely inside the lower tube, the loose fitting defining an annular passage of hydraulic fluid.

12. The variable load control system in a hydraulic device, according to claim 10, wherein the upper tubular head has a tapered upper mouth.

13. The variable load control system in a hydraulic device, according to claim 8, wherein the upper tubular head of the modular mechanism includes an area with lower superficial hardness than an area of the piston that the upper tubular head is connected to, such that initial contact between part of the piston and the upper tubular head when the piston and the upper tubular head approach each other is cushioned by the area with lower superficial hardness.

14. The variable load control system in a hydraulic device, according to claim 8, wherein the area with lower superficial hardness is defined by an annular component attached to an upper rim of the upper tubular head.

15. The variable load control system in a hydraulic device, according to claim 7, wherein an assembly of the lower tube and the annular support is connected to the tubular housing by interference fit such that the annular support is fixed to the tubular housing.

\* \* \* \* \*